United States Patent [19]

Sawada et al.

[11] Patent Number: 5,209,113
[45] Date of Patent: May 11, 1993

[54] AIR FLOW METER

[75] Inventors: Yukio Sawada, Anjo; Yukio Mori; Ryo Nagasaka, both of Nagoya; Takao Ban, Toyohashi; Norihide Hattori, Chiryu, all of Japan

[73] Assignee: Nippondenso Co., Ltd., Kariya, Japan

[21] Appl. No.: 692,392

[22] Filed: Apr. 25, 1991

[30] Foreign Application Priority Data

Apr. 26, 1990 [JP] Japan ................................ 2-110872
Feb. 27, 1991 [JP] Japan ................................ 3-33111

[51] Int. Cl.⁵ ............................ G01F 1/68; G01F 5/00
[52] U.S. Cl. .................................. 73/202.5; 73/118.2; 73/204.21
[58] Field of Search ................. 73/118.2, 202, 202.5, 73/204.21, 204.22, 204.25, 204.27

[56] References Cited

U.S. PATENT DOCUMENTS

| 3,314,290 | 4/1967 | Peranio . | |
|---|---|---|---|
| 3,374,673 | 3/1968 | Trageser | 73/204.21 |
| 4,325,253 | 4/1982 | Romann et al. | 73/204.27 |
| 4,562,731 | 1/1986 | Nishimura et al. | 73/202.5 |
| 4,709,581 | 12/1987 | Nishimura et al. . | |
| 4,776,213 | 10/1988 | Belchinger et al. | 73/202 |
| 4,793,176 | 12/1988 | Sato et al. | 73/118 |
| 4,887,577 | 12/1989 | Arai et al. . | |
| 4,920,808 | 5/1990 | Sommer | 73/202.5 |

FOREIGN PATENT DOCUMENTS

| 0173946 | 3/1986 | European Pat. Off. . |
| 0295647 | 12/1988 | European Pat. Off. . |
| 56-163668 | 12/1981 | Japan . |
| 57-105551 | 7/1982 | Japan . |

Primary Examiner—Herbert Goldstein
Attorney, Agent, or Firm—Cushman, Darby & Cushman

[57] ABSTRACT

An air flow meter has a cylindrical housing to be coupled to an intake air conduit of a vehicle in a way that a main passage is formed within said housing. An egg-shaped member has a bypass passage formed therein is supported by a plurality of supporting members in a center of the main passage. A flow rate detecting resistance is provided in the bypass passage. There are two throttling portions formed within the cylindrical housing. A downstream throttling portion, which is provided near an outlet of the bypass passage, throttles a flow of air in the main passage near the outlet of the bypass passage so as to cause air in the main passage to be introduced into the inlet of bypass passage by a pressure difference caused thereby. An upstream throttling portion, which is provided upstream of the downstream throttling portion, throttles a flow of air in the main passage so that the flow of air in the main passage is equalized.

25 Claims, 13 Drawing Sheets

AIR FLOW METER

FIELD OF THE INVENTION

The present invention relates to an air flow meter having a bypass passage, and more particularly to a hot-wire type air flow meter for an automotive internal combustion engine, which constitutes an intake system of the internal combustion engine, and is adapted to detect and control the flow rate of intake air.

BACKGROUND OF THE INVENTION

Conventional hot-wire type air flow meters having a bypass passage are known as disclosed in U.S. Pat. Nos. 3,314,290 and 4,709,581, Japanese laid-open patent application 57-105551 and Japanese laid-open utility model application 56-163668.

According to the above-disclosed conventional air flow meters, an outlet of a bypass passage is opened toward a throttling portion formed within an intake conduit in such a way that intake air flowing through the intake conduit is introduced into the bypass passage by the pressure difference that occurs between an inlet portion of the bypass passage and the throttling portion. The flow rate of air introduced within the bypass is detected by a hot-wire sensor provided in the bypass passage. When this kind of air flow meter is used for measuring the flow rate of intake air of an internal combustion engine for an automobile, the air flow meter is provided between an air cleaner and a throttle valve. For example, the air flow meter may be directly attached to the air cleaner casing. In such a case, however, an air flow of the introduced air is disturbed within the air cleaner casing before being monitored by the air flow meter. Therefore, an air flow near an outlet of the air cleaner casing becomes unequally distributed, and therefore the air flow immediately upstream of the air flow meter is similarly unequally distributed. The same phenomenon occurs when an intake conduit upstream of the air flow meter is bent near the air flow meter, or when a filter element of the air cleaner is soiled.

When there is unequal air flow upstream of the air flow meter, the flow rate of air introduced into the bypass passage is different from the average flow rate of intake air. As a result, an inaccurate flow rate is detected by the hot-wire sensor because of the above-described unequal air flow.

SUMMARY OF THE INVENTION

An object of the present invention is to provide an air flow meter which is capable of accurately detecting the flow rate even when an unequal air flow is introduced into the air flow meter.

For the purpose of achieving the above object, the invention comprises the following elements:

a housing which has an inlet portion and an outlet portion between which is formed a main passage through which air flows;

a bypass passage forming member, provided in said main passage of said housing, which has an inlet and an outlet for forming a bypass passage therein which is communicated with said main passage;

flow rate detecting means, provided in said bypass passage, for detecting a flow rate of air flowing through said bypass passage;

downstream throttling means for throttling a flow of air in said main passage near said outlet of said bypass passage so as to cause said air in said main passage to be introduced into said inlet of said bypass passage; and upstream throttling means, which is provided at a first location upstream of said downstream throttling means having a throttling area which is smaller than that of said downstream throttling means, for limiting a flow of air in each portion of said first location of said main passage so that the flow of air in said main passage is equalized.

According to this structure of the present invention, a part of the introduced air in the main passage is introduced into the bypass passage by the downstream throttling means.

Meanwhile, an air flow near the inlet portion of the housing is throttle by the upstream throttling portion so that the introduced air from the inlet portion of the housing turns to a circumference direction. As a result, the air flow downstream of the upstream throttling portion is equalized throughout the entire circumference of the inlet portion of the housing.

Accordingly, the flow rate in the bypass passage corresponds to the average flow rate of intake air flowing through the main passage.

BRIEF DESCRIPTION OF THE DRAWINGS

These and other aspects of the present invention will now be described in detail with reference to the accompanying drawings, wherein.

DETAILED DESCRIPTION OF THE INVENTION

First Embodiment

A first embodiment of the present invention is explained below with reference to FIG. 1 through FIG. 12.

Figure 1:
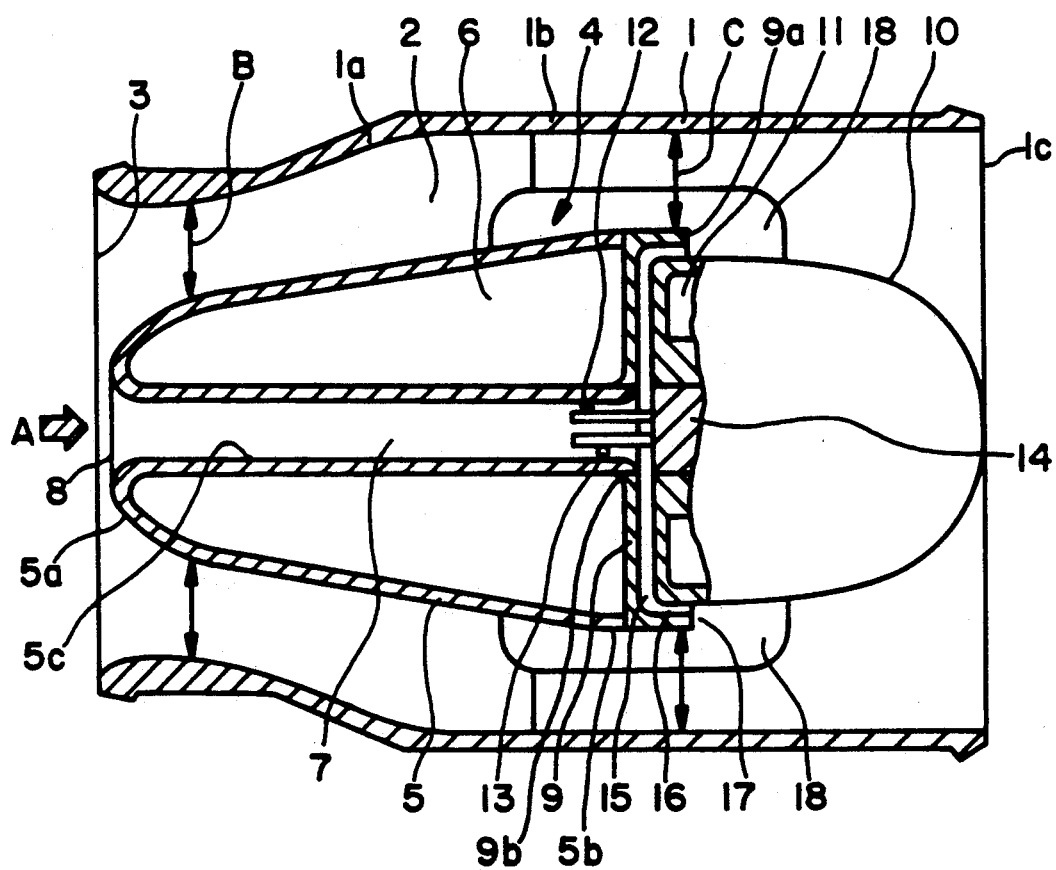
FIG. 1 is a partial sectional view showing a I—I section of a hot-wire type air flow meter of a first embodiment according to the present invention.
Figure 2:
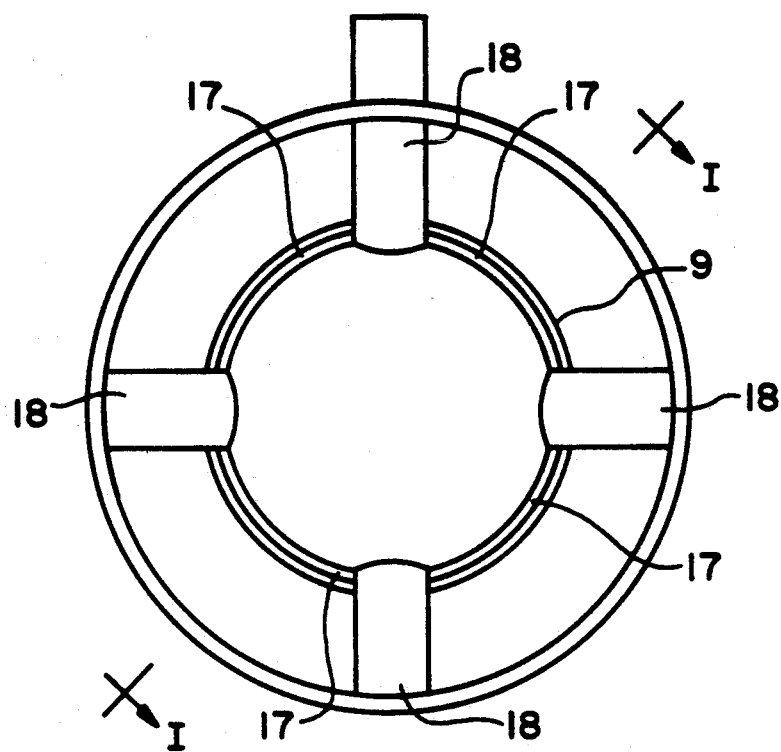
FIG. 2 is a plan view of the air flow meter in a direction from an arrow B shown in FIG. 1.

A hot-wire type air flow meter 100 is provided between an air flow meter and a throttle valve of an internal combustion engine so that it measures the flow rate of intake air which is introduced from the air cleaner and then supplied to the engine. Intake air is introduced into the air flow meter 100 from a direction indicated by an arrow A in FIG. 1. The air flow meter has a cylindrical housing 1 in which a main passage 2 of intake air is formed. An oval, egg-shaped center member 4 is supported by four ribs 18 extending from the housing 1 so that center member 4 is disposed in the center of housing 1 as shown in FIG. 2. The shape of the center member 4 is such to minimize the air resistance in the main passage. Both the housing 1 and the center member 4 are formed by an injected resin mold. A diameter of the inlet portion 3 of the housing 1 is smaller than that of the outlet portion 1c of the housing 1 in a way that an upstream throttling portion B is formed adjacent to the inlet portion 3.

The center member 4 includes an upstream potion 5 and a downstream portion 10. A bypass wall 5c of the upstream portion 5 is substantially parallel to the cylindrical surface of the housing 1, and extends from an upstream end 5a to a downstream end 5b so that a bypass passage 7 is formed in the upstream portion 5. The bypass passage 7 is surrounded by a hollow portion 6. An inlet portion 8 of the bypass passage 7 is provided downstream of the inlet portion 3 of the main passage 2.

The outer diameter of the upstream portion 5 is slowly enlarged from its upstream end 5a through its downstream end 5b to form a downstream throttling portion C between the downstream end 5b and an inner wall of housing 1, above a circular cover 9 in the main passage 2. The circular cover 9 has a center hole and is coupled to the downstream end 5b so that its peripheral end 9a is successively connected to the downstream end 5b.

Figure 4:
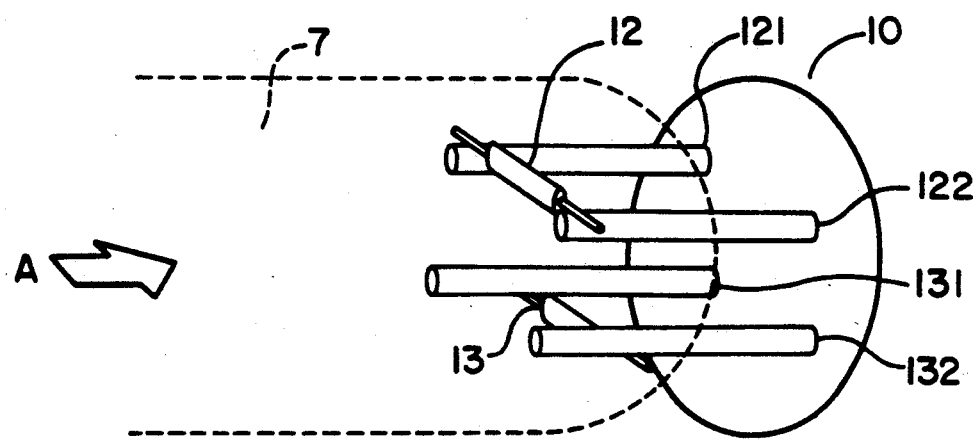
FIG. 4 is a schematic view showing air flow and placement of the flow detecting resistors in the first embodiment of the present invention.

A diameter of the downstream portion 10 of the center member 4 is a little smaller than that of the cover 9 so that a communication passage 15 is formed between the cover 9 and the downstream portion 10. The communication passage 15 is connected through a center hole 9b of the cover 9 to the bypass passage 7. According to this structure, an outlet portion 17 of the communication passage 15, which is of a ring-shape as shown in FIG. 2, is opened between the peripheral portion 9a of the cover 9 and the outer surface of the downstream portion 10. The downstream portion 10 includes a control circuit 14 which is surrounded by hollow portion 11. The control circuit 14 is electrically connected to a flow rate detecting resistance 12 and a temperature compensating resistance 13. FIG. 4 shows both resistances 12 and 13 respectively supported by supporting pins 121 and 122 and 131 and 132 so that they are exposed to air flow within the bypass passage 7.

Figure 3:
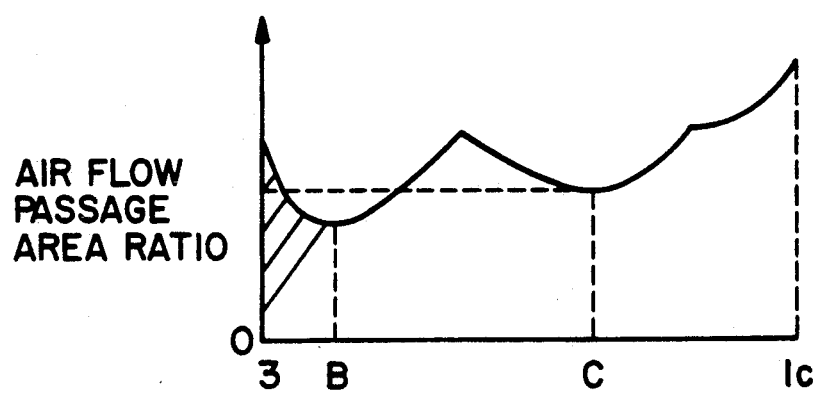
FIG. 3 is a graph showing a ratio of the main passage area within the air flow meter of the first embodiment of the present invention.

According to the above-described structure, an air flow passage area of the main passage 2 changes between the inlet portion 3 and the outlet portion 1c. This is shown in FIG. 3. FIG. 3 especially shows an important feature that an air flow passage area of the upstream throttling portion B is smaller than that of the downstream throttling portion C.

An operation of the first embodiment is explained below. Intake air from the air cleaner is introduced into the air flow meter 100 from the direction of arrow A as shown in FIG. 1. Since the air flow passage area of the throttling portion C is smaller than that of the inlet portion 3 of the housing 1, the air pressure in the throttling portion C is lower than that in the inlet portion 3. Therefore, the pressure of the outlet portion 17 of the communication passage 15 is lower than that of the inlet portion 8 of the bypass passage 7. This allows intake air to flow into the bypass passage 7 because of the pressure difference between the inlet portion 8 and the outlet portion 17. The flow rate of intake air flowing through the bypass passage 7 is detected by the flow rate detecting resistance 12.

Figure 5:
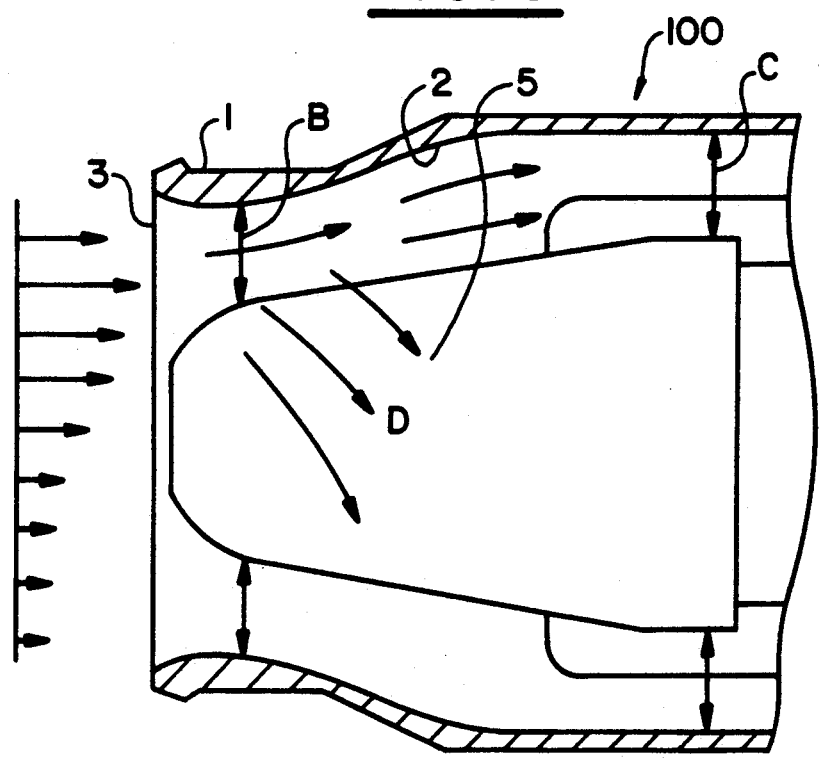
FIG. 5 is a schematic view showing air flow in the first embodiment of the present invention.

In this embodiment, even if intake air has an unequal air flow distribution as shown in FIG. 5, this unequal air flow is equalized when intake air passes the upstream throttling portion B. More specifically, when an amount of air near an upper end of the inlet portion 3 is more than the average amount of intake air, an air flow near the upper end of the inlet portion is throttled by the upstream throttling portion B so that the introduced air is deflected in a circumferential direction as indicated in arrows D in FIG. 5. This throttling occurs because only a certain amount of air per unit time can pass each part of the throttling portion, and air flow more than this is routed to another part of the throttling portion. Accordingly, air flow is equalized by this limiting. As a result, the air flow downstream of the upstream throttling portion B, the air flow near the outlet portion 17, is equalized throughout the entire circumference of the inlet portion 3. Meanwhile, the bypass passage 7 is sufficiently narrow and long as to equalize the introduced air in the bypass passage 7 when the introduced air flows through the bypass passage 7. Therefore, the introduced air in the bypass passage 7 is equally discharged from the outlet portion 17. Accordingly, the flow rate in the bypass passage 7 corresponds to the average flow rate of intake air flowing through the main passage 2.

Figure 6:
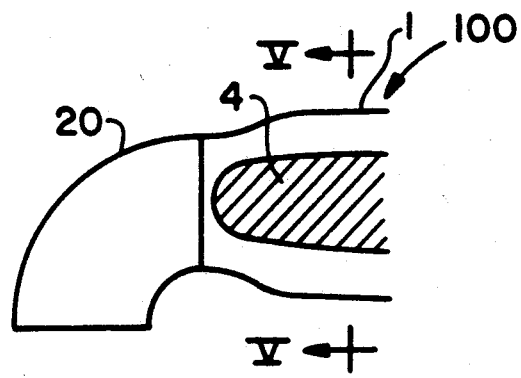
FIG. 6 is a schematic view showing an experimental apparatus applied to the first embodiment of the present invention.
Figure 7:
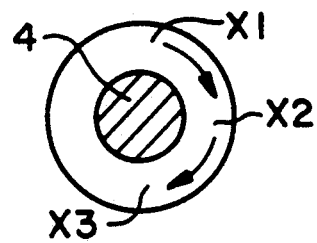
FIG. 7 is a sectional view of the experimental apparatus along a line V—V shown in FIG. 6.
Figure 8:
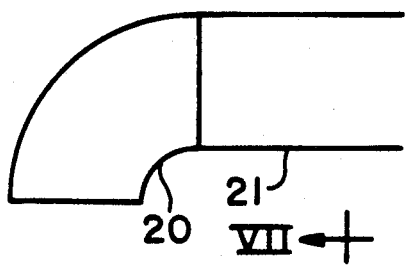
FIG. 8 is a schematic view showing an experimental apparatus as a reference example to be used to compare with the apparatus shown in FIG. 6.
Figure 9:
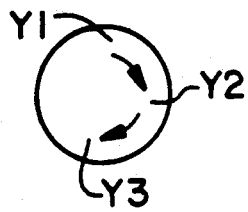
FIG. 9 is a sectional view of the experimental apparatus in a direction along a line VII—VII shown in FIG. 8.
Figure 10:
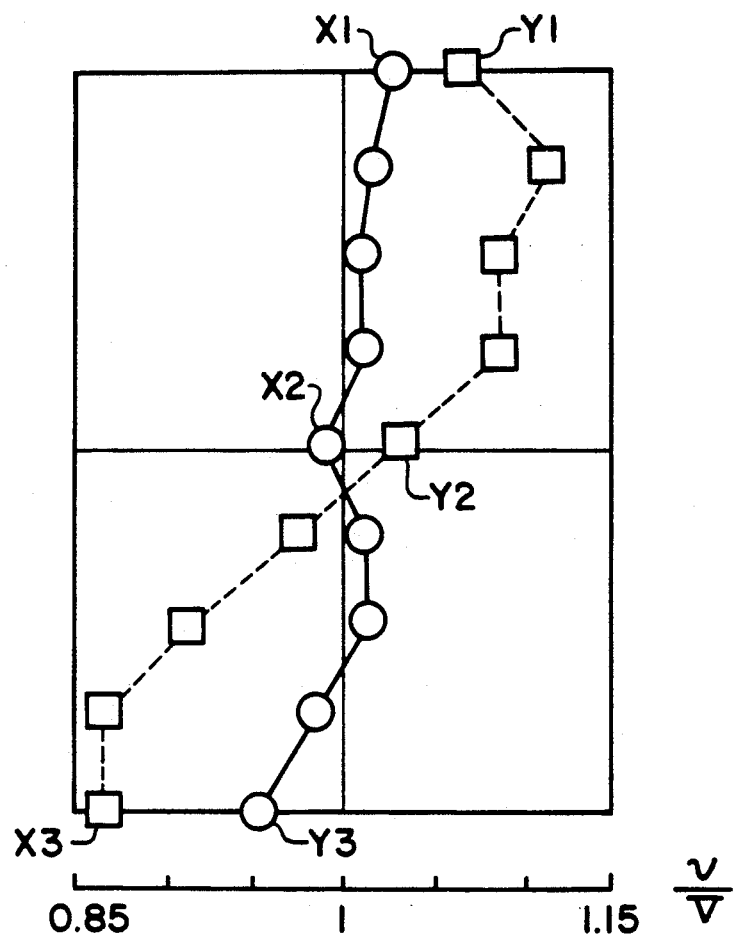
FIG. 10 is a characteristic graph showing a flow rate distribution in the first embodiment of the present invention, and showing a flow rate distribution in the reference example.

The above described equalization of air flow has been confirmed by the following experiments which were carried out by the inventors of the present invention. FIG. 6 shows an experimental apparatus for measuring an operation of the first embodiment of the present invention. This apparatus comprises a curved duct 20 and the air flow meter 100 which is coupled to the duct 20. This apparatus allows air flow rate to be measured at plural points X1 through X3 shown in FIG. 7, each of which is selected at a predetermined interval. FIG. 8 shows a reference apparatus for measuring an operation of a reference example. This apparatus comprises the curved duct 20 and a straight duct 21 which is coupled to the duct 20. For the purpose of comparing this apparatus with the above apparatus using the air flow meter 100, air flow rate was measured at plural points Y1 through Y3 shown in FIG. 9, each of which is selected at a predetermined interval. FIG. 10 shows two kinds of distribution with respect to each ratio of a flow rate V at each point to an average flow rate V, which are made based on the above mentioned measurement. A continuous line in FIG. 10 indicates a result of the first measurement that the flow rate at each point X1 through X3 becomes almost an average flow rate V according to the first embodiment. A broken line in FIG. 10 indicates a result of the second measurement that the flow rate at each point Y1 through Y3 is extremely different from the average flow rate V according to the reference example. The difference between the first embodiment of the present invention and the reference example is also shown in FIG. 11.

Figure 11:
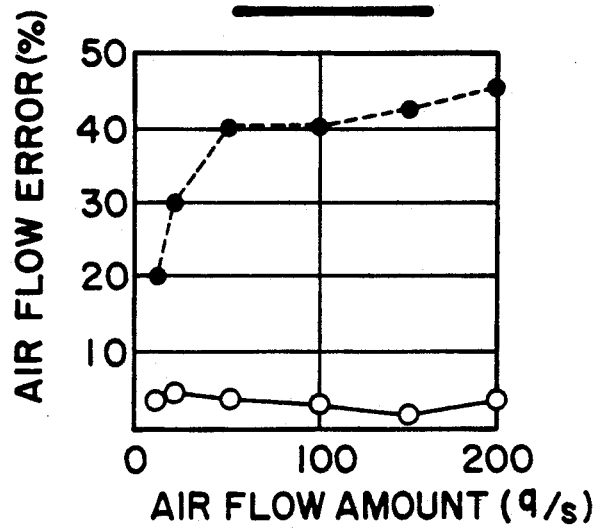
FIG. 11 is a characteristic graph showing error values of the detected flow rate in the first embodiment according to the present invention, and error values of the detected flow rate in the reference example.

FIG. 11 shows a measuring difference (error) between one case that the flow rate was measure by using a straight duct (not shown in the Figures), and the other case that the flow rate was measured by using the curved duct 20. According to the measurement using the first embodiment of the present invention, the error value is less than 10% as shown in FIG. 11 even when the amount of the flowing air is changed. However, according to the reference example, the error value increases when the amount of the flowing air increases.

Figure 12:
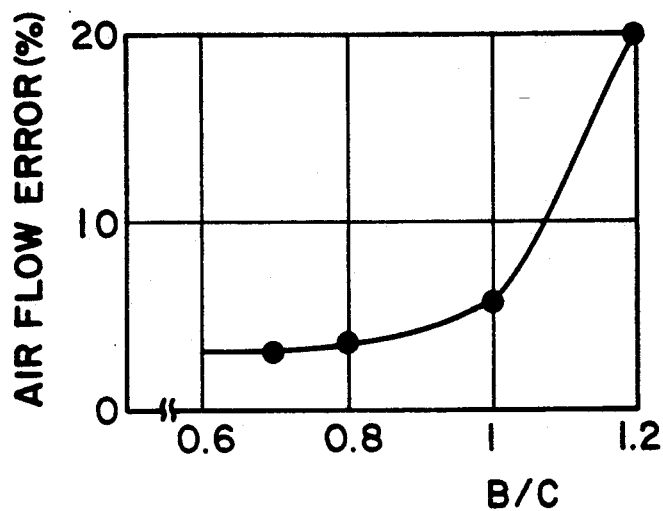
FIG. 12 is a characteristic graph showing a relationship between area ratio at throttling portions and the error value of the detected flow rate.

FIG. 12 shows a change of flow rate error value when a ratio of the diameter of the upstream throttling portion B to the diameter of the downstream throttling portion C is changed. As clearly shown in FIG. 12, when the diameter of the upstream throttling portion B (i.e. the throttling area of the upstream throttling portion B) is smaller than the diameter of the downstream throttling portion C (i.e. the throttling area of the downstream throttling portion C), the error value is extremely low. In this first embodiment of the present invention, the ratio of the diameter of the upstream throttling portion B to the diameter of the downstream throttling portion C is determined at 0.8 in consideration of the throttling effect and a flow resistance in the upstream throttling portion B.

Second embodiment

Figure 13:
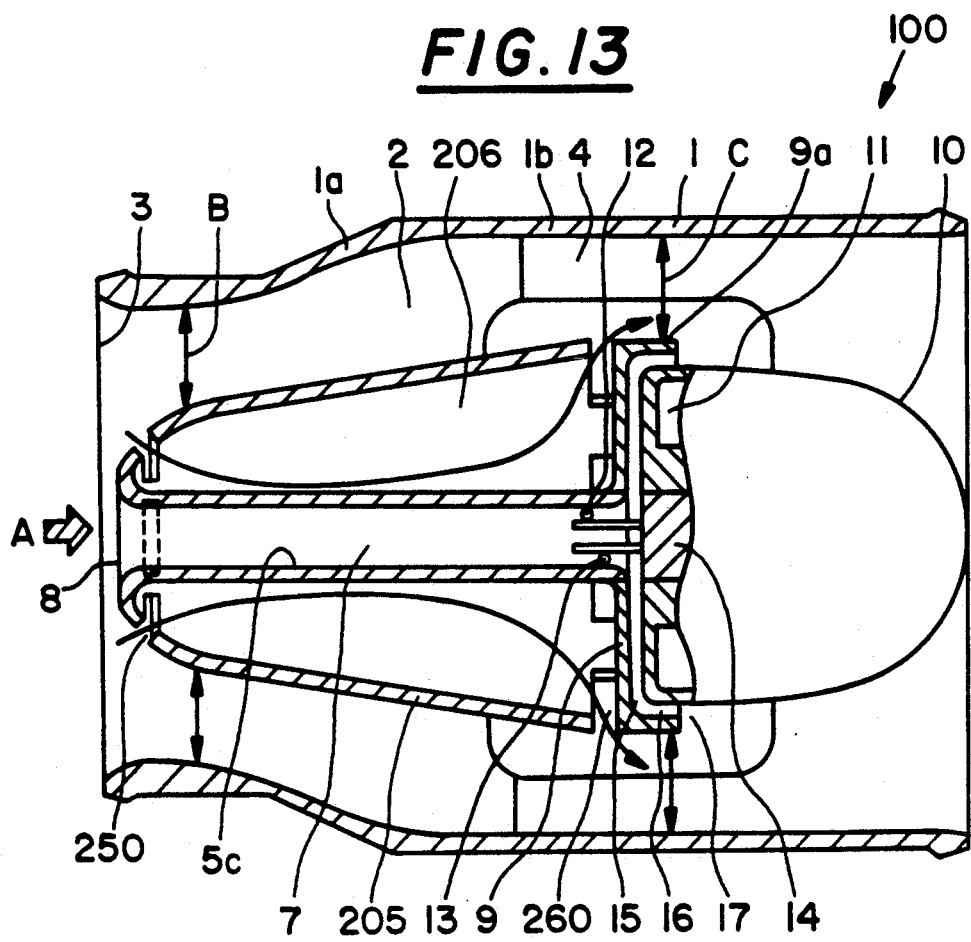
FIG. 13 is a partial sectional view showing a structure of a second embodiment of the present invention.

A second embodiment of the present invention is explained below with reference to FIG. 13 and 14.

This second embodiment has a structure for minimizing the effect that intake air within the bypass passage 7 is heated by heat of the bypass wall 5c. FIG. 13 shows a structure that ring-shaped openings 250 and 260 are formed on the upper portion 205. According to this structure, intake air is introduced from the ring-shaped opening 250 into the hollow portion 206, and then flows through the hollow portion 206 along the cylindrical bypass wall 5c, and finally is discharged from the ring-shaped opening 260 to the main passage 2. When the introduced intake air flows along the cylindrical bypass wall 5c, the inside of the wall (hollow portion 206) is cooled by the flowing air so that the temperature of the bypass wall 5c approaches that of the flowing air. Accordingly, a temperature of the flowing air within the bypass passage is maintained at a temperature of intake air flowing through the main passage 2.

Figure 14:
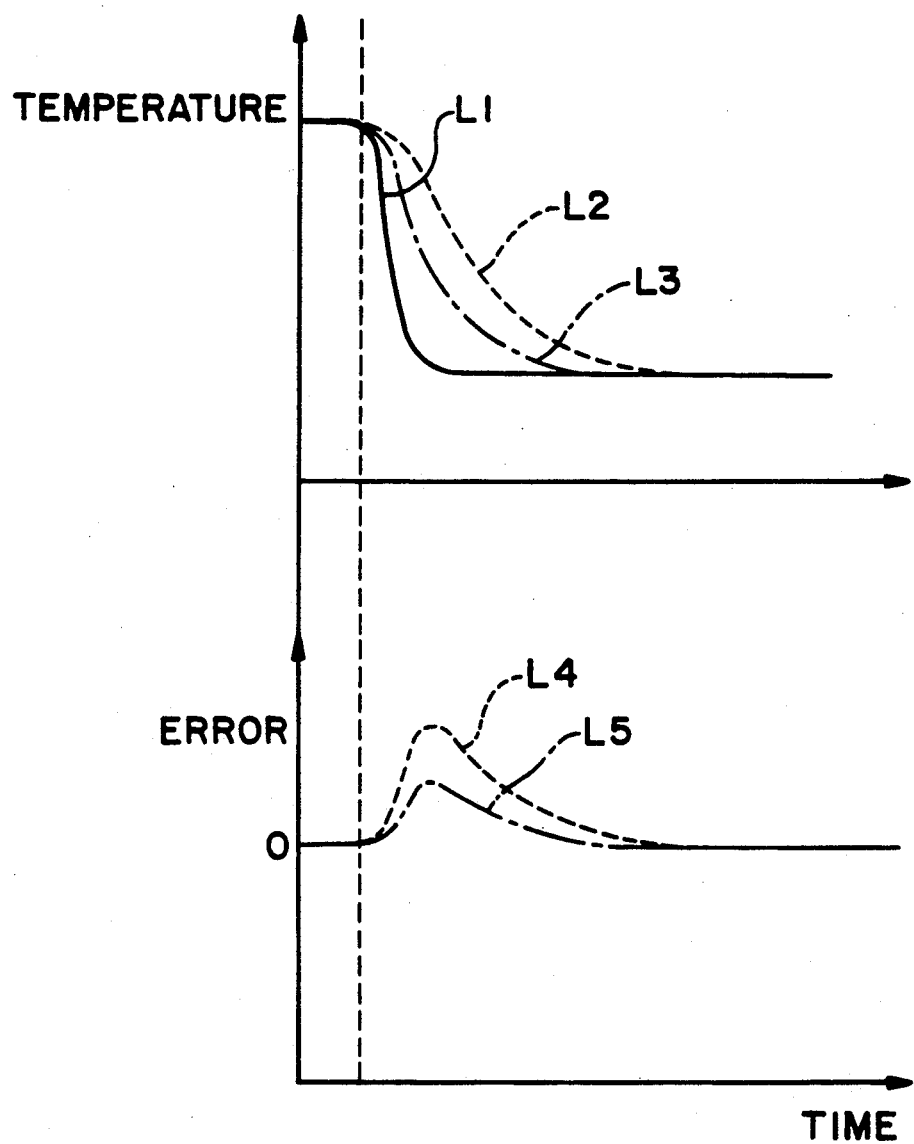
FIG. 14 is a characteristic graph showing a relationship between an intake air temperature and the error value of the detected flow rate when the second embodiment is used.

FIG. 14 illustrates a relationship between the temperature of the bypass wall 5c and a measurement error value of air flow amount. A continuous line L1, a broken line L2 and an alternate long and short dash line L3 indicates intake air temperature, the temperature of the bypass wall 5c shown in FIG. 13 and the temperature of the bypass wall 5c shown in FIG. 1, respectively. A broken line L4 and an alternate long and short dash line L5 respectively indicates a change of measurement error value of air flow amount due to the first embodiment and a change of measurement error value of air flow amount due to the second embodiment. In this case, the measurement error value of the second embodiment is lower than that of the first embodiment as illustrated in lines L4 and L5 because the temperature of the bypass wall 5c shown in FIG. 13 is closer to the intake air temperature than the temperature of the bypass wall 5c shown in FIG. 1.

Third embodiment

A third embodiment of the present invention is explained below with reference to FIG. 15 and FIG. 16.

Figure 15:
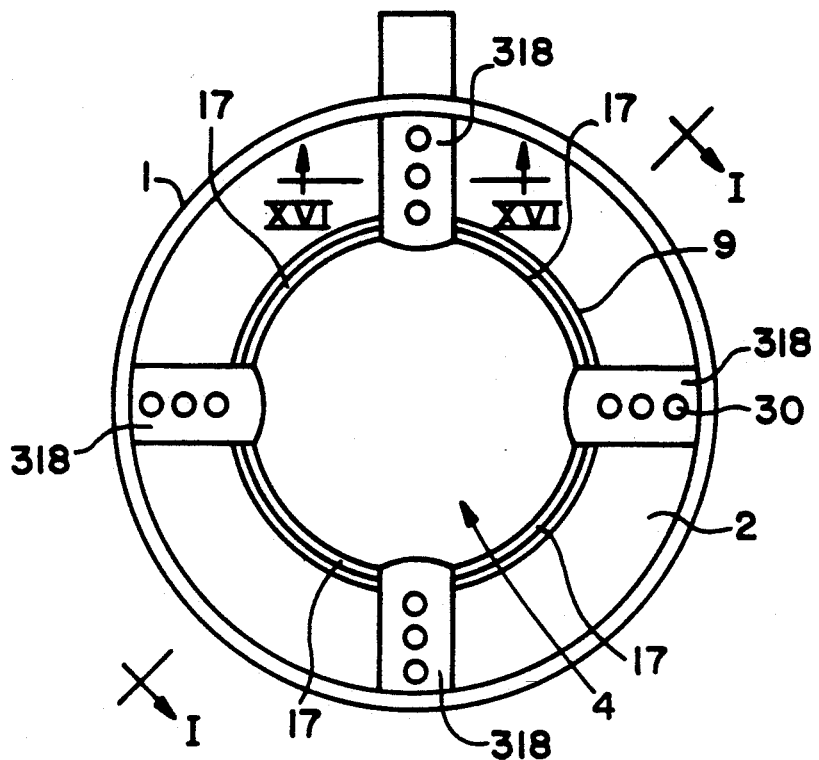
FIG. 15 is a plan view showing an air flow meter of a third embodiment according to the present invention.
Figure 16:
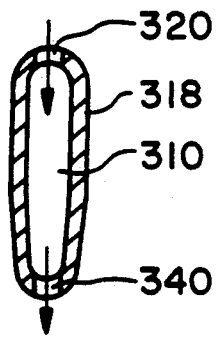
FIG. 16 is a sectional view showing a section cut by a XVI—XVI line shown in FIG. 15.

FIG. 15 and FIG. 16 show four ribs 318 each of which has three inlet holes 320 and three outlet holes 340. Intake air flowing through the main passage 2 is introduced from the inlet hole 320 into a hollow portion 310 and discharged from the outlet hole 340. The introduced intake air flowing through the hollow portion 310 causes a temperature of the ribs 318 to approach the temperature of the intake air.

Even when a temperature of the housing 1 is much higher than that of intake air flowing through the main passage 2, the intake air introduced within the hollow portion 310 prevents the high temperature of the housing 1 from being transferred to the center member 4. As a result, the temperature of the introduced intake air within the bypass passage 7 is approximately the same as the temperature of intake air flowing through the main passage 2 even when the housing 1 is very hot.

Fourth embodiment

A fourth embodiment of the present invention is explained below with reference to FIG. 17.

Figure 17:
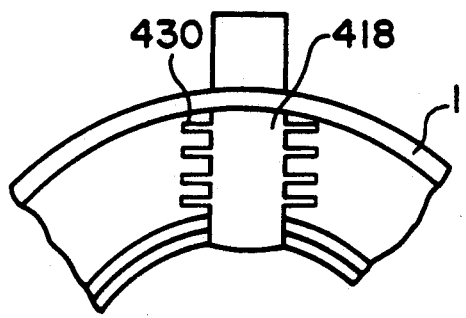
FIG. 17 is a plan view showing a rib in a fourth embodiment according to the present invention.

FIG. 17 shows a structure of rib 418 which has a plurality of radiating fins 430 for promoting a heat exchange between the rib 418 and intake air within the main passage 2. As explained in the above third embodiment, fins 430 prevent the high temperature of the housing 1 from being transferred to the center member 4.

Fifth embodiment

Figure 20:
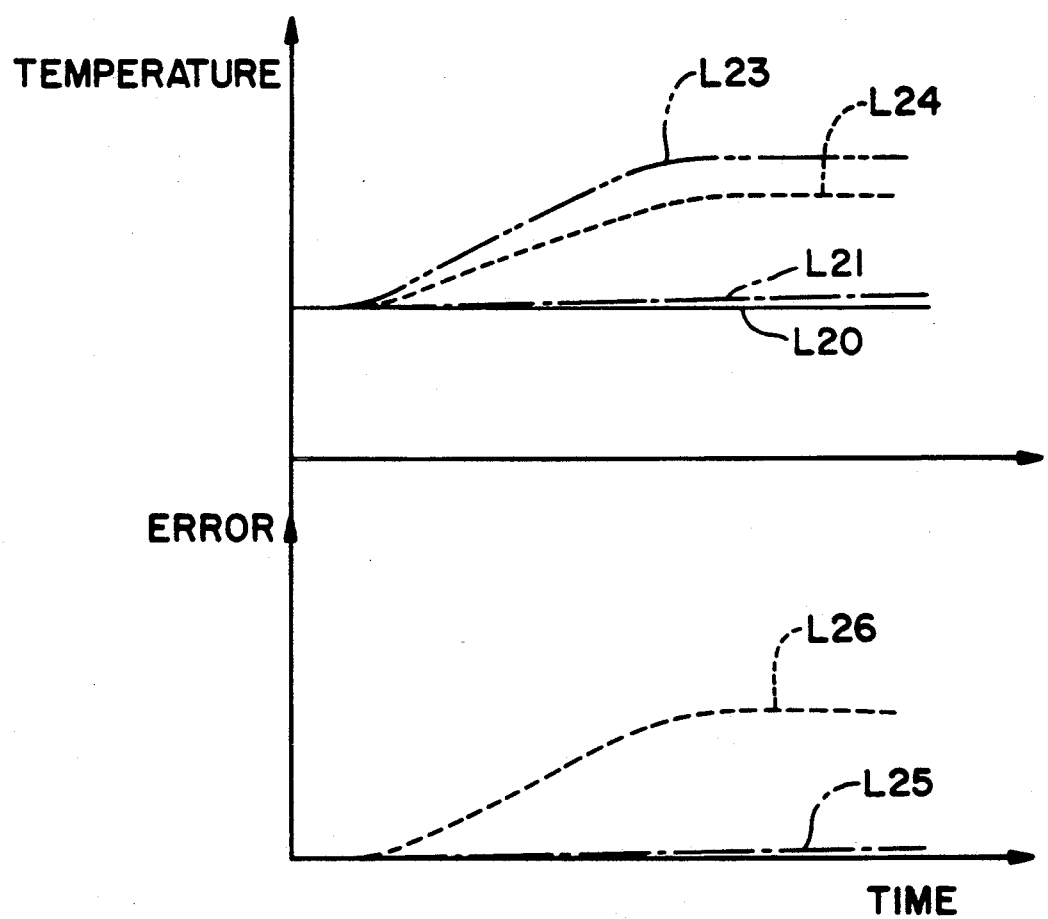
FIG. 20 is a characteristic graph showing a relationship between an intake air temperature and the error value of the detected flow rate when the fifth embodiment is used.

A fifth embodiment of the present invention is explained below with reference to FIG. 18 and FIG. 20.

Figure 18:
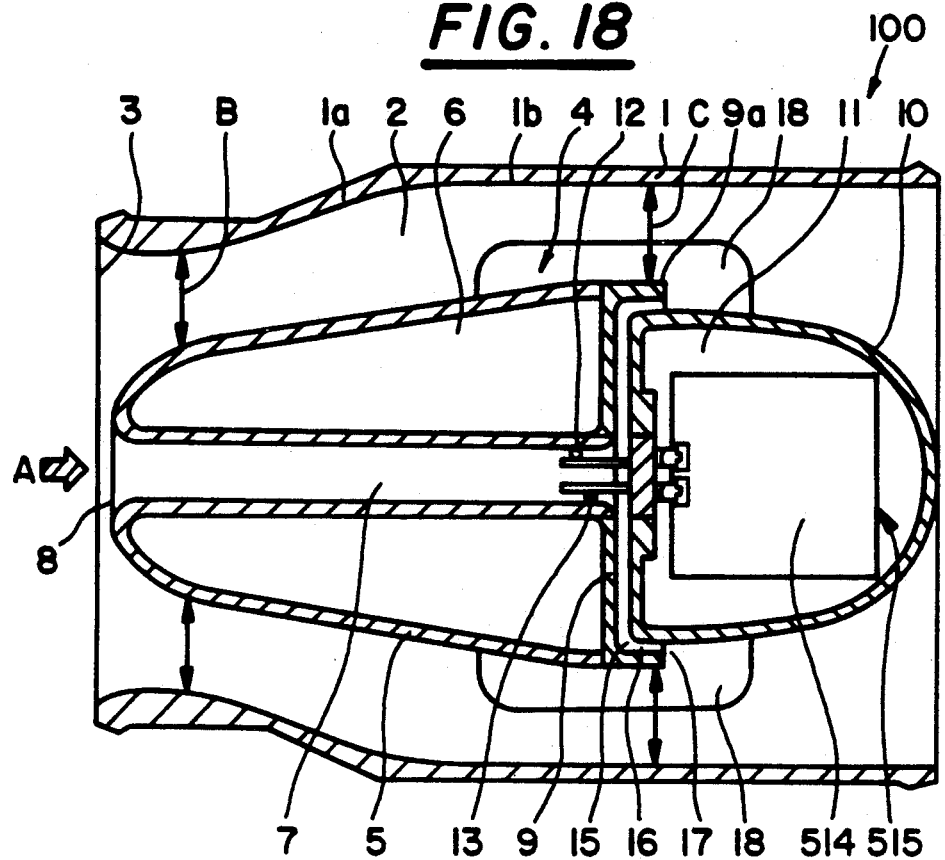
FIG. 18 is a sectional view showing a structure of an air flow meter of a fifth embodiment according to the present invention.
Figure 19:
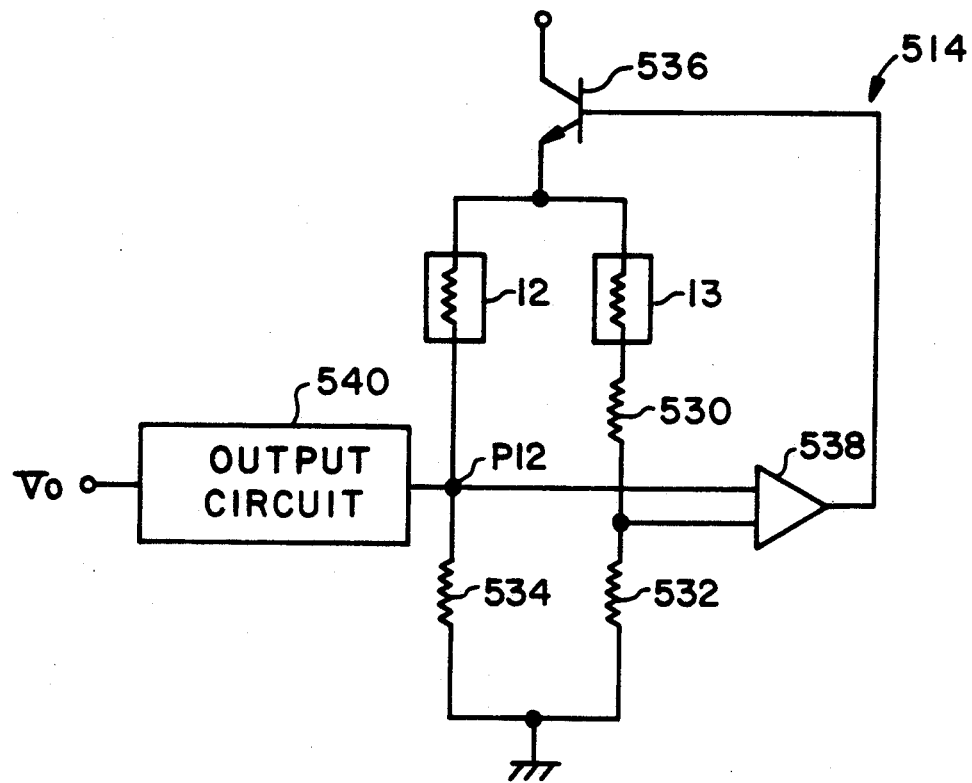
FIG. 19 is an electric circuit of the fifth embodiment according to the present invention.

FIG. 18 shows a circuit board of the control circuit 515 which is disposed in the hollow portion 11 of the downstream portion 10. FIG. 19 shows a bridge circuit in the control circuit 514. This bridge circuit includes resistances 530 and 534, each of which is respectively connected to the temperature compensating resistance 13 and the flow rate detecting resistance 12, and a resistance 532. In this circuit, a differential operational amplifier 538 controls a transistor 536 to maintain the bridge circuit as balanced. Voltage generated at a point P12 is amplified by an output circuit 540 and is output as Vo.

If the control circuit 540 were provided outside of the housing 1, resistance values of the resistances 530, 532 and 534 would be easily changed by radiant heat radiated from the internal combustion engine. However, according to this fifth embodiment, a temperature of the control circuit 540 approaches the temperature of intake air flowing through the main passage 2, because the circuit board is provided in the hollow portion 11 of the center member 4.

The inventors of the present invention measured error values of air flow amount in the above described fifth embodiment. The measurement was carried out as to an apparatus of the fifth embodiment in which the control circuit 540 is provided in the hollow portion 11 as shown in FIG. 18, and as to a reference apparatus in which the control circuit is provided outside of the housing 1. FIG. 20 illustrates a result of the measurement, namely a relationship between the temperature of the control circuit and a measurement error value of air flow amount. A continuous line L20 and an alternate long and two short dashed lines L23 indicate intake air temperature and the temperature of the housing 1, respectively. An alternate long and short dash line L21 and a broken line L24 respectively indicate the temperature of the control circuit 540 shown in FIG. 18 and a temperature of the control circuit which is provided outside of the housing 1. When the temperature of the control circuit is higher than that of intake air as shown in the line L24, the measured error value of air flow amount increases as shown in a broken line L26. However, when the temperature of the control circuit is almost the same as that of intake air as shown in line L21, the measured error value of air flow amount is very low as shown by the alternate long and short dash line L25.

Sixth Embodiment

Figure 21:
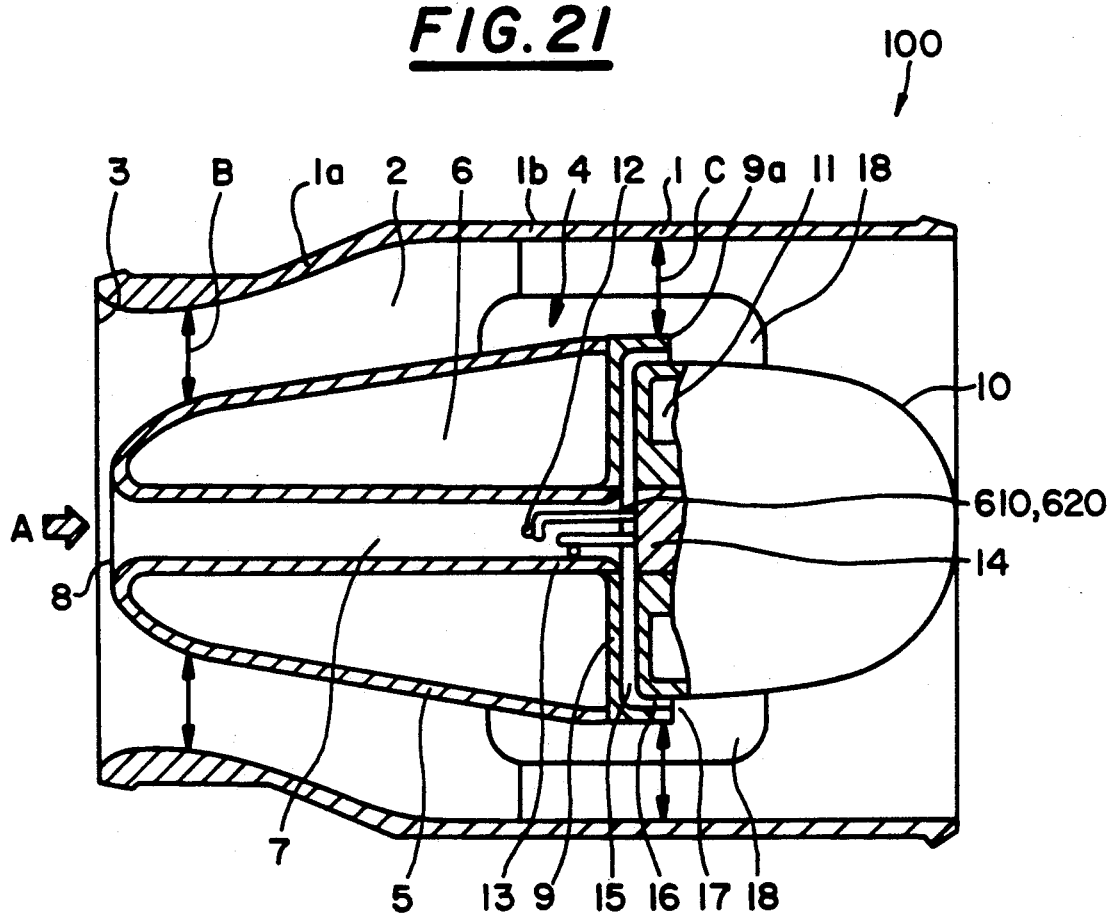
FIG. 21 is a partial sectional view showing a structure of an air flow meter of a sixth embodiment according to the present invention.

A sixth embodiment of the present invention is explained below with reference to FIG. 21 and FIG. 24.

Figure 22:
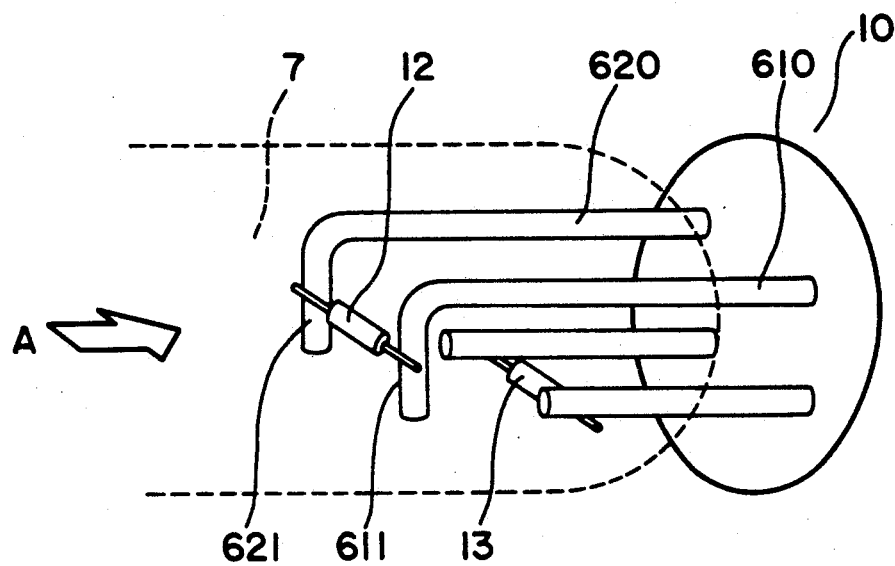
FIG. 22 is a schematic view showing a supporting structure of a resistance of the sixth embodiment according to the present invention.

FIG. 22 shows a structure of supporting pins 620 and 610 both of which are bent perpendicular to the flowing direction (indicated by the arrow A) of the introduced intake air within the bypass passage 7 to form bent portions 611 and 621. The flow rate detecting resistance 12 is supported by both bent portions 611 and 621. This supporting structure increases a response of the flow-rate detecting resistance 12 to a temperature change of intake air.

The temperature response of the flow-rate detecting resistance 12 according to the sixth embodiment is explained by comparing the supporting structure of the sixth embodiment with that of the first embodiment.

Figure 23:
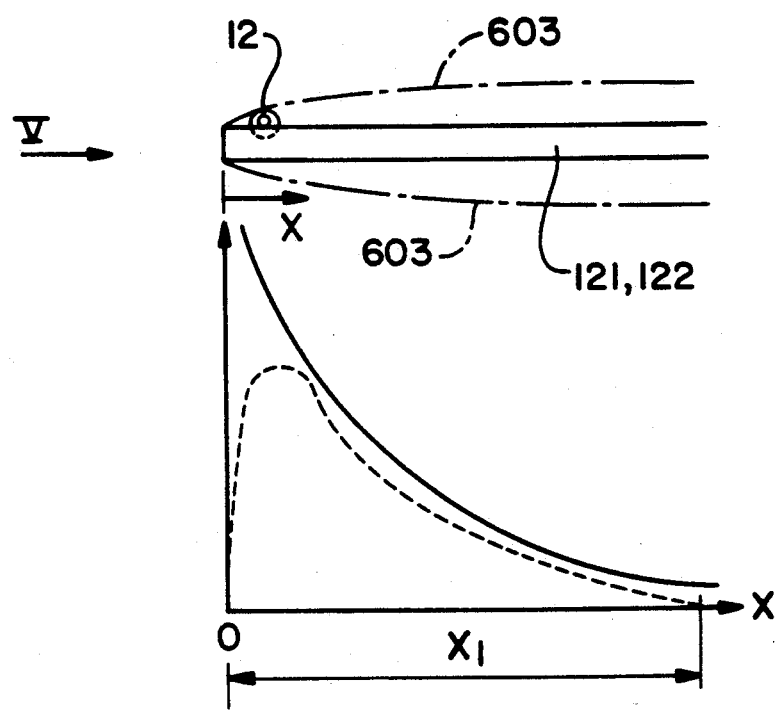
FIG. 23 is a graph showing a temperature distribution when the first embodiment is used.

FIG. 23 shows a relationship between the supporting structure of the flow rate detecting resistance 12 and the temperature distribution of the supporting pins 121 and 122 according to the first embodiment. A continuous line indicates a thermal conductivity between air and the supporting pins 121 and 122. A broken line indicates a temperature distribution of the supporting pins 121 and 122. When the flow rate detecting resistance 12 is supported by the pins which are parallel to the flowing direction (indicated by an arrow V) of the introduced intake air within the bypass passage 7, a temperature boundary layer 603 is formed around the supporting pins 121 and 122 as shown in FIG. 23. This temperature boundary layer 603 prevents heat conduction between the supporting pins 121 and 122. Accordingly, the thermal conductivity is getting lower from the end of the supporting pins 121 and 122 toward the root thereof. As a result, the temperature distribution is spread in a wide range X1 as shown in FIG. 23.

Figure 24:
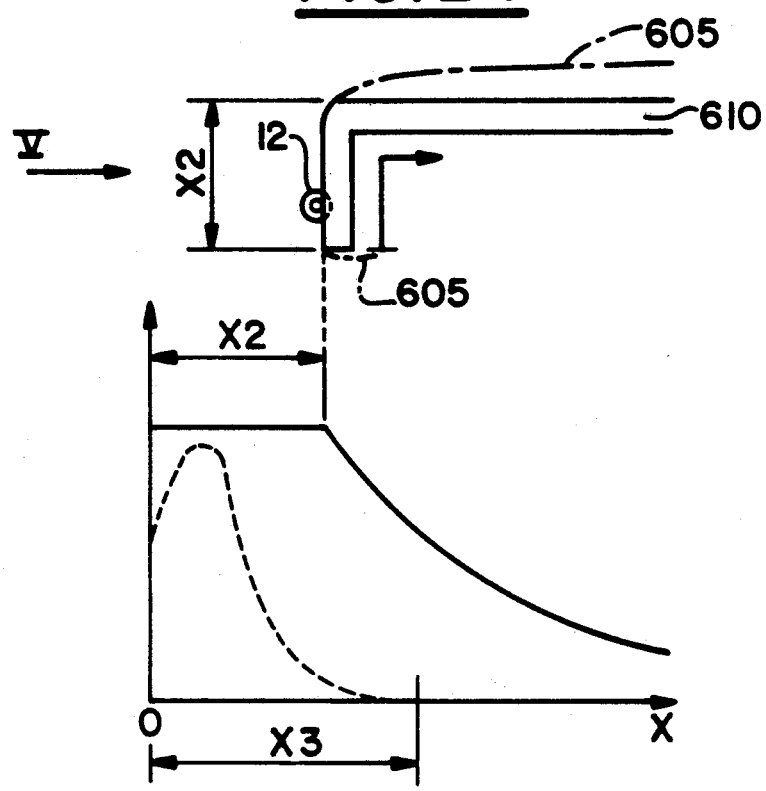
FIG. 24 is a graph showing a temperature distribution when the sixth embodiment is used.

FIG. 24 shows a relationship between the supporting structure of the flow rate detecting resistance 12 and the temperature distribution of the supporting pins 610 and 620 according to the sixth embodiment. A continuous line indicates the thermal conductivity between air and the supporting pins 610 and 620.

A broken line indicates a temperature distribution near the bent portions 611 and 621. When the flow rate detecting resistance 12 is supported by the bent portions 611 and 612 as shown in FIG. 22, a temperature boundary layer 605 is very thin near the bent portions 611 and 612 as shown in FIG. 24. As a result, the temperature distribution near the bent portions 611 and 612 is formed in a range X3 which is considerably shorter than the range X1 shown in FIG. 23. Since the temperature distribution range X3 shown in FIG. 24 is shorter than the range X1 shown in FIG. 23, the flow rate detecting resistance 12 according to the sixth embodiment reaches a stable operating condition faster than that of the first embodiment when the engine of the vehicle is started, namely, when electric current is supplied to the resistance 12. In the meantime, when the vehicle is accelerated or decelerated, the corresponding intake air sharply increases or decreases. However, when the flow rate of intake air sharply increases or decreases, the temperature of the flow rate detecting resistance 12 quickly changes in response to such increase or decrease according to the sixth embodiment of the present invention.

Seventh Embodiment

A seventh embodiment of the present invention is explained below with reference to FIG. 25.

Figure 25:
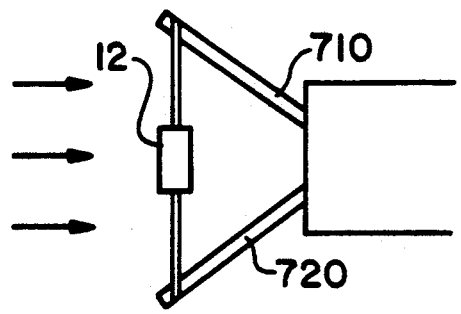
FIG. 25 is a plan view showing a supporting structure of a resistance of a seventh embodiment according to the present invention.

FIG. 25 shows a structure of supporting pins 710 and 720 which are diagonal to the flowing direction of intake air. According to this structure, the same effect as the above-mentioned sixth embodiment is obtained as to the quick temperature response of the flow rate detecting

Eighth Embodiment

An eighth embodiment of the present invention is explained below with reference to FIG. 26.

Figure 26:
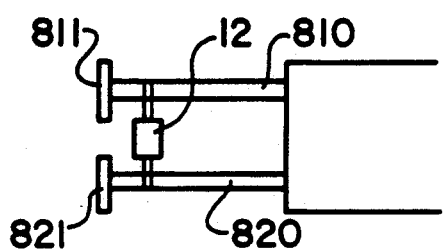
FIG. 26 is a plan view showing a supporting structure of a resistance of an eighth embodiment according to the present invention.

FIG. 26 shows a structure of supporting pins 810 and 820 on top of which heat conducting members 811 and 821 are respectively provided. According to this structure, the same effect as the above-mentioned sixth embodiment is obtained as to the quick temperature response of the flow rate detecting resistance 12.

Although only a few embodiments have been described in detail above, those having ordinary skill in the art will certainly understand that many modifications are possible in the preferred embodiment without departing from the teaching thereof.

All such modifications are intended to be encompassed within the following claims.

What is claimed is:

1. An air flow meter comprising:
   a housing which has an inlet portion and an outlet portion between which is formed a main passage through which air flows;
   a bypass passage forming member, provided substantially in a center of said main passage of said housing, including an inlet and an outlet opened at an outer periphery of said bypass forming member at a location opposing an inner surface of said housing for forming a bypass passage which is communicated with said main passage;
   flow rate detecting means, provided in said bypass passage, for detecting a flow rate of air flowing through said bypass passage;
   downstream throttling means formed between said inner surface of said housing and an outer surface of said bypass passage forming member, for throttling a flow of air in said main passage near said outlet of said bypass passage at a first throttling area so as to cause said air in said main passage to be introduced into said inlet of said bypass passage; and
   upstream throttling means, which is provided between said inner surface of said housing and said outer surface of said bypass passage forming member and surrounding said outer surface of said bypass passage forming member at a first location upstream of said downstream throttling means to form a second throttling area which is smaller than said first throttling area of said downstream throttling means, for limiting a flow of air in each cross-sectional segment of said first location of said main passage so that the flow of air in said main passage is equalized.

2. An air flow meter as set forth in claim 1, wherein said housing is coupled to an intake air passage of an internal combustion engine.

3. An air flow meter as set forth in claim 1, wherein said bypass passage extends substantially parallel to a flow of air flowing through said main passage so that a flow of said introduced air is equalized while such an air flows through said bypass passage.

4. An air flow meter as set forth in claim 1, wherein said bypass passage forming member has an air passage surrounding said bypass passage.

5. An air flow meter as set forth in claim 1, wherein said bypass passage forming member is supported by a plurality of ribs coupled between said housing and said bypass passage forming member.

6. An air flow meter as set forth in claim 5, wherein said ribs include heat conduction preventing means for preventing heat of said housing from transferring to said bypass passage forming member.

7. An air flow meter as set forth in claim 1, wherein said bypass passage forming member includes a control circuit formed therein for controlling said flow rate detecting means in a way that a temperature of said control circuit approaches that of air within said main passage.

8. An air flow meter as set forth in claim 1, wherein said bypass passage forming member is an egg-shaped member.

9. An air flow meter as set forth in claim 1, wherein said flow rate detecting means includes a resistance which radiates heat when electric current is supplied thereto, and at least two supporting pins which extend from a downstream end of said bypass passage toward upstream of said bypass passage, and having extended portions so as to support said resistance with said extended portions.

10. An air flow meter as set forth in claim 9, wherein said each supporting pin has a straight portion which extends parallel to a direction of air flow in said bypass passage, and a bent portion which is formed upstream of said straight portion at a right angle to a direction of air flow in said bypass passage so as to support said resistance therewith.

11. An air flow meter as set forth in claim 9, wherein said supporting pins are oriented in a nonparallel relation to a direction of air flow in said bypass passage.

12. An air flow meter as set forth in claim 9, wherein each said supporting pin has a heat conducting members on an upstream end thereof.

13. An air flow meter comprising:
    a housing, which has an inlet portion and an outlet portion, forming a main passage through which air flows;
    a bypass passage forming member, provided substantially in a center of said main passage of said housing, which has an inlet and an outlet opened at an outer periphery of said bypass passage forming member, at a location opposing an inner surface of said housing, for forming a bypass passage therein which is communicated with said main passage and extends long enough to equalize a flow of air introduced from said main passage through said inlet into said bypass passage;
    flow rate detecting means, provided in said bypass passage, for detecting a flow rate of air flowing through said bypass passage;
    downstream throttling means formed between said inner surface of said housing and an outer surface of said bypass passage forming member, for throttling a flow of air in said main passage at a first throttling area near said outlet of said bypass passage so as to cause air in said main passage to be introduced into an inlet of said bypass passage; and
    upstream throttling means, which is provided between said inner surface of said housing and said outer surface of said bypass passage forming member and surrounding said outer surface of said bypass passage forming member at a first location upstream of said downstream throttling means to form a second throttling area which is smaller than said first throttling area of said downstream throttling means, for limiting a flow of air in each cross-sectional segment of said first location of said main passage so that the flow of air in said main passage is equalized.

14. An air flow meter as set forth in claim 13, wherein said housing is coupled to an intake air passage of an internal combustion engine.

15. An air flow meter as set forth in claim 13, wherein said bypass passage forming member is an egg-shaped member.

16. An air flow meter as set forth in claim 13, wherein said bypass passage forming member has an air passage surrounding said bypass passage.

17. An air flow meter as set forth in claim 13, wherein said bypass passage forming member is supported by a plurality of ribs coupled between said housing and said bypass passage forming member.

18. An air flow meter as set forth in claim 17, wherein said ribs include heat conduction preventing means for preventing heat of said housing from transferring to said bypass passage forming member.

19. An air flow meter as set forth in claim 13, wherein said bypass passage forming member includes a control circuit formed therein for controlling said flow rate detecting means in a way that a temperature of said control circuit approaches that of air within said main passage.

20. An air flow meter as set forth in claim 13, wherein said flow rate detecting means includes a resistance which radiates heat when electric current is supplied thereto, and at least two supporting pins which extend from near a downstream end of said bypass passage toward upstream of said bypass passage and support said resistance.

21. An air flow meter as set forth in claim 20, wherein said each supporting pin has a straight portion which extends parallel to a direction of air flow in said bypass passage, and a bent portion which is formed upstream of said straight portion at a right angle to a direction of air flow in said bypass passage so as to support said resistance therewith.

22. An air flow meter as set forth in claim 20, wherein said supporting pins are provided in a non-parallel direction to a direction of air flow in said bypass passage.

23. An air flow meter as set forth in claim 20, wherein each said supporting pin has two heat conducting members on an upstream end thereof.

24. An air flow meter for a vehicle comprising:
a cylindrical housing which has an inlet portion, an outlet portion, and a main passage therein through which intake air flows;
an egg-shaped member, provided in said main passage of said housing, which has an inlet, an outlet, and a bypass passage therein which is communicated with said main passage;
a plurality of supporting members for supporting said egg-shaped member substantially in a center of said main passage of said cylindrical housing;
flow rate detecting means, provided in said bypass passage, for detecting a flow rate of intake air flowing through said bypass passage;
downstream throttling means, which is provided near said outlet of said bypass passage, for throttling a flow of air in said main passage near said outlet of said bypass passage so as to cause a pressure difference which causes air in said main passage to be introduced into said inlet of said bypass passage; and
upstream throttling means, which is provided at a first location upstream of said downstream throttling means, having a throttling area which is smaller than that of said downstream throttling means, for limiting a flow of air in each portion of said first location of said main passage so that the flow of air in said main passage is equalized.

25. An air flow meter as set forth in claim 20, wherein said bypass passage is formed to extend long enough to equalize a flow of air introduced from said main passage through said inlet into said bypass passage.

* * * * *